United States Patent [19]

Baensch et al.

[11] Patent Number: 5,759,581
[45] Date of Patent: Jun. 2, 1998

[54] FOOD TEXTURE AGENT COMPRISING PARTICLES OF HIGH-AMYLOSE STARCH AND METHOD OF MAKING SAME

[75] Inventors: Johannes Baensch, Singapore, Singapore; Didier Gumy, Bulle, Switzerland; Dietmar Sievert, Belmont, Switzerland; Pierre Wursch, La Tour de Peilz, Switzerland

[73] Assignee: Nestec SA, Vevey, Switzerland

[21] Appl. No.: 714,169

[22] PCT Filed: Jul. 13, 1995

[86] PCT No.: PCT/IB95/00556

§ 371 Date: Sep. 27, 1996

§ 102(e) Date: Sep. 27, 1996

[87] PCT Pub. No.: WO96/03057

PCT Pub. Date: Feb. 8, 1996

[30] Foreign Application Priority Data

Jul. 22, 1994 [EP] European Pat. Off. ............. 94111443

[51] Int. Cl.$^6$ .......................... A61K 9/14; C08B 30/12
[52] U.S. Cl. .................................. 424/489; 127/32
[58] Field of Search .................... 435/101, 102, 435/103, 200, 202, 205, 208, 209, 210; 127/32, 38, 58; 424/489, 94.61

[56] References Cited

U.S. PATENT DOCUMENTS

| | | | |
|---|---|---|---|
| 5,051,271 | 9/1991 | Iyengar et al. | 426/578 |
| 5,094,872 | 3/1992 | Furcsik et al. | 426/578 |
| 5,137,742 | 8/1992 | Bakal et al. | 426/589 |
| 5,281,432 | 1/1994 | Zallie et al. | 426/549 |
| 5,368,878 | 11/1994 | Smick et al. | 127/36 |
| 5,378,286 | 1/1995 | Chiou et al. | 419/2 |
| 5,387,426 | 2/1995 | Harris et al. | 426/573 |

FOREIGN PATENT DOCUMENTS

| | | |
|---|---|---|
| 0 486 936 | 5/1992 | European Pat. Off. . |
| WO 90/15147 | 12/1990 | WIPO . |
| 91/01091 | 2/1991 | WIPO . |
| WO 94/03049 | 2/1994 | WIPO . |
| WO 94/14342 | 7/1994 | WIPO . |

OTHER PUBLICATIONS

M. Glicksman, "Hydrocolloids and the Search for the [Oily Grail]", Food Technology, Oct. 1991, pp. 94–103, vol. 94.
K. Behall et al., "Diets containing high amylose vs amylopectin starch: effects on metabolic variables in human subjects", The American Journal of Clinical Nutrition, Feb. 1989, vol. 49, No. 2, pp. 337–344.
F. Senti, "High–Amylose Corn Starch: Its Production, Properties, and Uses", Starch: Chemistry and Technology, vol. II, Chapter XXI, pp. 499–512, (1967), (Academic Press: NY).
Sievert et al. "Amylose Chain Association Based on Differential Scanning Calorimietry", J. Food Sci (1993) 58(6): 1332–4.

Primary Examiner—Jean C. Witz
Assistant Examiner—Susan Hanley
Attorney, Agent, or Firm—Young & Thompson

[57] ABSTRACT

A food grade texture agent in the form of thermally stabilized swelling resistant and non crystalline particles of high amylose starch, which present a gelled soft structure, in which the amylose content of the starch is between 40 and 70%, and in which 90% of the particles have a diameter in the range of 5 to 30 microns. This agent can be prepared by suspending the high amylose starch in water, heating the slurry thus obtained to about 80°–100° C., preferably 90°–100° C., under continuous controlled stirring without shearing but sufficient to avoid particle aggregation and so as to form the desired particle gel product, and then cooling the product. It can be used in food preparations as a fat substitute and/or a whitening agent.

14 Claims, No Drawings

FOOD TEXTURE AGENT COMPRISING PARTICLES OF HIGH-AMYLOSE STARCH AND METHOD OF MAKING SAME

FIELD OF THE INVENTION

The present invention relates to a new food grade texture agent, to the use thereof in food preparations as a fat replacer and to a process for its preparation.

BACKGROUND OF THE INVENTION

Consumer awareness of the caloric content of foods has increased very much over the past few years and has brought about a demand for foods having a reduced fat content. This demand has created a need in the food industry to replace at least a portion of the fat and/or oil in prepared foodstuffs. It has been suggested that certain starch hydrolysate products (WO-A-91/01091 and EP-A-0443844) as well as chemically, enzymatically or retrograded modified starches (WO-A-91/07106 and WO-A-94/09645), alone or in combination, can be used as fat replacers or substitutes.

Apart from the purpose of starch as a fat replacer, there is now an increasing demand for non-chemically modified texture agents. In view of the consumer trends and preference for "natural" ingredients in foods, a starch based preparation which has not been subjected to enzymatic hydrolysis, solvent treatment or chemical modification would offer an obvious advantage for the use in foods.

Furthermore, it is known that fat plays a crucial role in the palatability of foods and its reduction often alters the sensory quality and texture. Therefore reducing or replacing normal fat content in food products while maintaining good taste and texture is a challenge faced by the industry, more particularly so as to develop fat substitutes that have as far as possible the right combination of taste and mouthfeel. This problem can be partially resolved by replacing fat by carbohydrate and protein based ingredients which have a lower caloric value and allow an increase in the water content. However, a good fat-mimetic system tries to achieve the viscous-lubricitious-absorptive profile of the fat itself. Since this cannot be readily accomplished with any single ingredient except for the synthetic fat substitutes, the most practical way to accomplish this is by using a combination of materials that can supply the desired sensory properties. They generally consist in a combination of water with thickening agent, soluble bulking agents and/or microparticulate components, with or without surface active lipids, the whole producing a creamy texture. The microparticulates provide a ball-bearing effect which improves and smoothes out the flow properties of the fat-replacer system and thus enhances the fatty perception of the food. They are usually insoluble materials, typically smaller than 3 microns, which are not perceived as particles by the tongue. The best known is microcrystalline cellulose, which was developed in the early 60's. More recently, the microparticulated proteins of egg, whey and milk protein have been proposed for such applications, but the choice of microparticulate components derived from starch is very limited and they are very expensive (see for example M. Glicksman in Food Technol. 45, 94–103, (1991), as well as EP-A-0,486,936 and WO-A-91/07106).

SUMMARY OF THE INVENTION

The purpose of the present invention is therefore to provide a new kind of food grade texture agent which presents all the characteristics to be usable as a fat and/or oil replacer, especially to produce a fatty mouth-feel and which can be produced in a relatively easy and inexpensive manner avoiding the use of solvents and/or other chemicals.

The present inventors have now unexpectedly found that high amylose starch in the form of particle gel having an average diameter of at least 3 microns fulfills the above requirements, and can be further obtained by a method involving only the combined action of heat and mechanical treatment.

Consequently, the first object of the present invention is a food grade texture agent in the form of thermally stabilized swelling resistant and non crystalline particles of high amylose starch, which present a gelled soft structure, in which the amylose content of the starch is of 40 to 70%, and in which 90% of the particles have a diameter in the range of 5 to 30 microns.

According to a second object of the invention, the above-defined texture agent is usable in food preparations as a fat substitute. It can also be used in such food preparations as a whitening agent.

A third object of this invention consists in a process for the preparation of the above-defined food grade texture agent, which comprises the steps of suspending the high amylose starch in water, heating the slurry thus obtained at about 90° to 100° C., preferably 95°–100° C., under continuous controlled stirring without shearing, but sufficient to avoid particle aggregation and so as to form the aimed particle gel product, and then cooling said product. The stirring must effectively be such that a high shearing is avoided which could destroy the particles. However, the stirring has to be sufficient to avoid particle aggregation during the heat treatment and to thus allow the stabilization of the particle structure.

Preferably, the process includes a second heating step up to 40° to 80° C.

The above process can be advantageously carried out under a pressure of about 0.3 bar. Each step of this process can be of about 30 min. for the first heating up to 95'–100° C., maintaining said temperature during about 30 min., cooling the product obtained up to about room temperature within about 25 min., further heating said product up to 40°–80° C. within about 15 min., and cooling it again within about 5 min. to room temperature.

The particulate product of the invention is thus obtained in the form of grains having a gelled soft structure, which retained in fact the non crystalline structure of the starting starch used. The particles have not been chemically modified nor altered by the controlled thermal and mechanical treatment, and have proven to be resistant to shearing, heating (up to 125° C.) and acid, as well as swelling resistant, for example in aqueous medium up to 120° C. The average diameter of the particles is of about 15μ, whereas the particles size distribution is such that 90% of the particles have a diameter in the range of about 5 to 30μ. Despite the fact that the above sizes are somewhat above the usual size of particles to be perceived by the tongue, the particulate starch according to the invention is practically not perceived as particles by the tongue thanks to the gelled soft structure thereof, and thus constitutes a perfect fat-mimetic system to be used in food preparations.

The product of the invention can also further be dried to powdered form to be reconstituted in water, for example either by freeze-drying and milling or by spray-drying. In this latter case, maltodextrin can be advantageously added prior to drying so as to improve the process, preferably in a ratio of 1:0.5 to 1:1 to the high-amylose starch.

It can also be in the form of a tridimensional particle gel network at a concentration of about 10 to 30% wt in an aqueous phase.

According to another embodiment of the present invention, a modified food grade texture agent can be obtained by starting from a mixture of high amylose starch and cereal flour, like rice flour, so as to lead to improve the sensory properties (flavour, taste) of the final product. The high amylose starch/cereal flour ratio depends on the desired texture and flavour properties of the aimed final product. For example, a 1:1 ratio in the case of rice flour was found to give good results with regards to texture (creaminess) and flavor. The rice flour masks the off-flavor of high amylose starch and this latter suppresses the rice flavor. Of course, other appropriates cereals grains may be used in conjunction with the present invention, including for example corn, wheat, oat, barley, backwheat, rye, sorghum and millet.

As to the process of preparation with the above mixture is concerned, the same conditions apply as those already recited, eventually involving a slightly lower heating temperature in some particular cases, i.e. between about 80° and 100° C.

The conditions used according to the present invention are aimed to a partial gelatinization of the high amylose starch and full gelatinization of the starch of cereal flour. Full gelatinization of the high amylose starch, e.g. by high temperatures, as well as complete disruption and loss of integrity of the high amylose starch granules by applying high pressure or high shear mixing should be avoided. The continuous mixing action during the heating and cooling prevents the formation of a continuous polymer gel network and the formation of starch aggregates during processing. Thereby, homogenous products are obtained. Modification of the starch in accordance with this invention is thus achieved only by the combined action of heat and mechanical treatment, no additives other than water being required.

In the process according to the present invention, one important parameter is constituted by the stirring conditions, which have to involve a shearing effect so as to avoid an aggregation of the particles during the whole process, but especially during cooling, said aggregation having negative consequences, i.e. syneresis and hardening of the gel. Despite the fact that high amylose starch gelatinizes only partly at around 100° C., a sufficient stirring is thus needed to avoid aggregation of the granules. On the other side, it is also necessary to avoid too high a shearing effect which could destroy the structure of the particles.

Two main types of reactions can be used, as providing the appropriate shearing conditions: a first one having a specific conic geometry with scraping and connecting recycling effect, and a second one which have a cylindrical geometry and a special vertical blades arrangement.

More particularly, the following two pilot plant reactors have been advantageously used:

(1) Becomix (A. Berents GmbH & Co KG, Stuhr/Bremen, Germany (with conic geometry))

A maximum of 10 L starch slurry can be processed. The slurry can be homogenised and/or thoroughly mixed. Only the mixing mode was used: one kg of starch was suspended in 4 L water; the slurry was heated in a double jacket form ambient to 80°–100° C. within 30 minutes, depending on the raw material, the pressure being maintained at 0.3 bar; the slurry was kept for 30 min. at 80°–100° C. and then cooled to 20°–30° C.; a second heating cycle at 40° C. gave a smoother gel.

(2) MBR Reactor (Bio-Reactor AG, Switzerland) (cylindrical geometry)

A maximum of 5 lt starch slurry can be processed. Thorough mixing is achieved by rotating blades at 200 rpm, heating and cooling temperature and mixing speed can be manually adjusted via a control unit. Processing of the starch slurry is done under the same conditions as described for Becomix.

For the preparation of small quantities of product, another reactor has been used in laboratory (bench scale), i.e OCI Omni-Mixer (Omni International, Waterbury, Conn., USA) in which high amylose starch or a blend of high amylose starch and native starch (such as rice starch/flour, wheat starch, potato starch) were prepared as followed: 20 g of starch or blend of starches were suspended in 80 ml water. The slurry was transferred into the mixing chamber of the Omni-Mixer with knife blades rotating at 1000–2000 rpm. The starch slurry was heated by immersing the chamber in an oil bath maintained at 100° C. for 30 minutes. Then, the mixing chamber was placed in a water bath under continuous mixing for 10 minutes. Finally, the mixing chamber was immersed in an ice bath for 10 minutes.

Although enzymes are not at all required to carry out the process to prepare the products according to the present invention, they can nevertheless be used in certain cases for modifying the texture where it is important to somewhat reduce the viscosity and/or the particle size of the final product. Amylolytic enzymes can thus be employed, such as $\alpha$-amylases, and added at the 0.05–1.5% level (50–500 U/20 g starch) in case of high amylose starch alone and at the 0.003–0.1% level in case of a mixture of high amylose starch and rice flour.

However, where enzymes are used in the preparation process, it is then necessary to have a final heating step up to about 80°–125° C., preferably about 80° C., during about 30 min., and to carefully check, for example by the standard Phadebas-method, that no residual $\alpha$-amylase activity can be detected. Practical tests have shown that the use of pancreatic $\alpha$-amylase (200 U/20 g starch) in the production of the high amylose starch preparation leads to a reduction in particle size (measured with a Malvern scattering instrument) and viscosity (measured with the Carri-Med controlled stress rheometer) of the final product. No aggregation of particles and phase separation (syneresis) was noted over a 7 days storage period at 4° C.

The high amylose starch product according to the present invention has the following attributes: homogenous, smooth, creamy texture, no sticky-pasty consistency, white colour, opaque, high sheen, resistant to acid, thermoreversible. Culinary applications have been performed as a fat substitute, for example in Bechamel sauce (28% energy reduction), mayonnaise (34%), French salad dressing (26%), low fat yoghurt, etc. The particle starch is further characterized by a strong whitening effect, for example in low-fat mayonnaise.

Furthermore, due to the very high content of amylose, about 30 to 50% of the particulate starch is resistant to digestion and thus will be slowly fermented by the large intestine like dietary fibres. The remaining starch is very slowly digested by the pancreatic $\alpha$-amylase.

It can thus even be envisaged to use the particulate starch according to the present invention in liquid or semi-liquid formulas for diabetics, as well as possibly for the treatment of ulcerative colitis.

It is finally very important to note that the particulate starch according to the invention can be sterilized in either form, i.e. as a gel or as a reconstituted aqueous suspension, the particulate structure being maintained after such sterilization, so that it can be stored in a stable form during several months, at least more than 6 months.

DETAILED DESCRIPTION OF THE INVENTION

The present invention will now be described in more details and illustrated by the following examples.

EXAMPLE 1

Preparation and Properties of the Particulate Starch

As starting products for the preparation of the aimed particular starch, two different kinds of native high amylose starch have been used, i.e. "Eurylon VII" (from Roquette, Lestrem, France) containing 70% amylose and "Amaizo 2568F" (American Maize Product CO., Hammond, Ind., USA) containing 45–50% of amylose.

Other products have been used in this example, such as native potato starch, wheat starch and rice starch (from Sugro AG, Basel, Switzerland), native rice flour "MP-40 Siam Patna" (from Hafliger, Switzerland) and native "Prowashonupana" (PWSNP) barley flour (from Con Agra, Omaha, USA), which contains waxy starch and 17% β-glucan (hydrocolloid) as well as α-amylase "B-100" (from Gist-Brocades, Delft, Netherlands) having an activity of 18000 RAU/S.

In order to determine the more appropriate practical processing conditions for obtaining the product of the invention, several samples of the particulate starch have been prepared and tested; more particularly size distribution of the particles, rheology of the concentrated gels and other analysis have been carried out.

(a) Size distribution was performed with a laser light scattering Malvern Mastersizer IP (Malvern Instruments, Worcs, UK) equipped with a 300 mm focal length. 5 ml of freshly prepared gel was diluted in 50 ml $H_2O$ and stirred overnight. To obtain a minimum obscuration of 0.15, about 7–12 ml was introduced in the sample presentation unit, which contains bidistilled water, mixed at a speed of 80% and pumped at a speed of 80% into the optical cell.

(b) Rheological measurements were carried out with a Carri-Med CSL 100 controlled stress rheometer (Carri-Med Ltd, Dorking, UK) operating at a frequency of 1 Hz with a parallel-plate geometry (4 cm, 1 mm gap). The torque sweep test was performed from 1 to 30 Pa in 20 steps at 20 °C.

Storage modulus G' and phase shift δ were read from the linear viscoelastic domain. The 20% w/w starch gel was also characterized after shearing with a small Polytron (Ultra-Turrax, Janke & Kunkel AG, IKA WERK, Staufen i. Breisgau, Germany) at speed 2 for 30 s, and one day after shearing. The 20% w/w starch gel was characterized after heating for 30 min at 100° C. and one day after heating. Finally, evolution of the gel stored at 4° C. was measured up to 7 days.

(c) Other analytical methods were used, such as more particularly in the case of the starch product prepared with enzymes the reducing sugar method (maltose determinations) from Somogyi (J. Biol. Chem. 195, 19, 1952), and the detection of the residual α-amylase activity with the Phadebas Amylase test (Pharmacia Diagnostics AB, Uppsala, Sweden).

The starch products prepared with enzymes had dextrose equivalents of less than 3. The term dextrose equivalent, abbreviated as DE describes the degree of conversion of starch to a starch hydrolysate. It is defined as the percentage of reducing sugars in a product, calculated as glucose, on the dry weight basis of the product. Native starch has a DE of about 0, glucose powder has a DE of 100.

Also scanning electron microscopy (SEM) was used on dry starch sprinkled onto Leit-c and sputtered with gold.

Starch gel was enclosed in a deep-well stub, washed for 2 hours in distilled water, fixed on glutaraldehyde, dehydrated via acetone and critical-point-dryer.

From the several various trials carried out with the above-mentioned starting products and applying various processing conditions, it resulted that one of the essential parameter to obtain the desired particulate starch is the heating temperature; the optimal temperature range with high amylose starch alone is between 90° and 100° C., more particularly 90° to 95° C. with "Amaizo" and 95° to 100° C. with "Eurylon", whereas this temperature range can be somewhat lowered until 80° to 90° C. when the high amylose starch is mixed with rice flour for example.

Of course, and as already stated before, the stirring and shearing conditions during heating and cooling are very important to avoid aggregation of the product.

In practice, the initial ratio of high amylose starch to water is about 10 to 30% weight when used alone, and of about 2.5 to 15% weight when used with rice flour for example, this latter been used at a ratio of about 5 to 15% weight.

As to the properties of the high amylose starch products obtained by the various trials carried out, they can be summarized as follows (a) The particulate starch products consist in swollen, partially gelatinized high amylose starch granules which are loosely associated with one another, thereby forming a three-dimensional particle gel network throughout the aqueous phase. The starch product has the following attributes:

- smooth, creamy texture; homogeneous, no sticky-pasty consistency;
- creamy consistency at solids level >17% (d.m.);
- salad-dressing type consistency between 13–17% solids;
- white colour, opaque, high sheen;
- stable during a two week storage; syneresis can be reversed by mixing the product;
- resistance to acid;
- resistance to shearing and to heating;
- thermoreversibility: heating the product to 95° C. for 30 min. reduces slightly the gelling properties; during cooling to room temperature, the gelling properties (solid like structure) do not recover, but storage overnight in the refrigerator leads to full recovery of the gelling, solid like properties; a second heating gives a more elastic, more creamy gel.

(b) Scanning electron microscopy shows the structure of the dry particulate starch, which has a soft structure, whereas gelled starch exhibits a pitted surface structure with amylose residues attached.

(c) An off-flavour in the high amylose starch can be perceived. In food preparations, this off-flavour very often disappears due to the low concentration used or due to masking of the off-flavour by other food constituents. It was also found that incubation of the starch preparation with lactic acid bacteria improves the flavour of the preparation.

(d) Starting from a mixture of high amylose starch and rice flour leads to an improvement of the sensory properties (flavor, taste) of the final product. The high amylose starch/rice flour ratio used depends on the desired texture and flavour properties of the final product. A 1:1 to 1:4 ratio, preferably about 1:1, of high amylose starch and rice flour was found to give good results with regard to texture (creaminess) and flavour. Generally, the rice flour masks the off-flavour of high amylose starch and the high amylose starch suppresses the rice flavour. A smooth, creamy texture develops over two to three days storage at refrigeration temperature, as a result of amylopectin retrogradation.

(e) Regarding the particles size distribution, the results obtained with "Eurylon" are as follows:

starting product (Eurylon): 90% between about 2 and 15 microns (about 10%<2μ).

after first heating step: 90% between 6 and 60 microns.

particulate starch of the invention: 90% between about 5 and 30 microns (about 10%>30μ).

The high amylose starch/rice flour product consists of swollen, partially gelatinized high amylose starch granules and a phase comprising water, fully gelatinized rice starch, denatured rice protein, and other rice flour components. The presence of partially gelatinized high amylose starch granules in the product prevents the formation of a continuous polymer gel of gelatinized rice starch. The product characteristics are smooth and creamy texture;

bland flavour and taste (no perceived flavour problem);

no syneresis;

the gel is softer than high amylose product;

the gel resists to shearing and heating.

Scanning electron microscopy shows whole high amylose starch granules recovered with disrupted rice starch granules which form a weak network. Interactions between high amylose starch granules is less pronounced. The network formed is less sticky and more creamy than in low amylose products.

The particle size of the rice flour is important with regard to sensory properties (graininess) and structure formation (gel strength). The particle size of the rice flour is preferably below 100 μm. Regular rice flour with a significant proportion of particles>180 μm can also be used. Then, homogenization (e.g. colloid mill, homogenize, high shear force mixing) of the rice flour with water (weight ratio 1:8) should be carried out prior to mixing the rice flour/water slurry with the high amylose starch in the 9:1 ratio. This mixture is then processed as described about for the dry mixture of high amylose starch and rice flour.

(e) A wide range of particle size flour 1 to 100 μm is obtained. Although a particulate gel is not perceived below about 3 μm, the particulate system contained at least about 95% of particles bigger than 3 μm, but less than about 5% of particles bigger than 70 μm. The average size of the particles can generally range between 10 and 20 μm, preferably about 15 μm; in other words, 50% of the total volume distribution is generally smaller than about 15 μm.

EXAMPLE 2

High amylose starch (250 g) and high fiber Prowashonupana barley flour (250 g) which contains 18% β-glucan were prepared in the Becomix reactor as described for the high amylose starch/rice flour mixture. The product obtained has a brownish colour, a creamy texture and is stable (no syneresis) over a 7 days storage. This product is also shear and freeze/thaw stable. Probably, the waxy PWSNP barley starch and β-glucan contribute to this stability.

EXAMPLE 3

This example illustrates the production of dehydrated particle starch by spray-drying. Suspensions are prepared of 2 kg "Eurylon VII" in 8 kg water, respectively of 2 kg "Eurylon" and 1 or 2 kg maltodextrin (DE 6 to 12) in 6 kg water.

The suspensions are heated in the Becomix reactor as explained in Example 1. At the end, each suspension is dried in a spray tower under the following conditions rotational speed 20000–23000 rpm, inlet temperature 150°–165° C., outlet temperature 75°–85° C.

As a result of the drying proceeding in the above conditions, it appeared that the dehydrated particle starch obtained with a prior mixing with maltodextrin gives after reconstitution as a suspension in water a creamy and smooth product, whereas that without maltodextrin is rough and presents aggregates. It has also been shown that the addition of maltodextrin prior to drying hinders the swelling of the high-amylose starch granules during the heating steps, so that a narrower distribution of particle size is obtained and the further dispersion of the starch is facilitated, avoiding the formation of lumps.

Furthermore, is was demonstrated that a 5% suspension in water of the product thus dehydrated can be sterilized (at about 120° C.) and lead to a very stable suspension, the particulate structure being preserved.

EXAMPLE 4

Bechamel Sauce

This example illustrates the use of high amylose starch in a Bechamel sauce recipe with reduced calories.

More particularly, high amylose starch (Eurylon VII or Amaizo 2568F) or high amylose starch and rice flour was stirred (80–130 rpm) and heated (80°–100° C.) in water as described before in a Becomix reactor, maintained at the appropriate temperature during about 10 min., and then cooled to 20° C. (90–130 rpm).

The other usual ingredients of the sauces (milk powder, maize starch, species, aroma, etc.) were added and the mixture was heated a second time at about 80° C., still under constant stirring (about 105 rpm) and then cooled again. The sauces obtained were kept in jars at 4° C. before the tasting and the rheological evaluation.

A Bechamel reference was also prepared as follows: sunflower oil was mixed with water (3.4% wt.) and the suspension was stirred (105 rpm) during a few minutes. Then the other usual ingredients mentioned above were added and the mixture was heated at 95° C. during 10 min under constant stirring (95 rpm). After cooling still under stirring (105 rpm), the sauce was put in jar and kept at 4° C.

The various prepared Bechamel sauces including the reference were then tasted, after having been heated in a water-bath at about 65° C. A panel of 12 experienced sensory accessors was used to evaluate the samples several times. More particularly, the sauce samples were evaluated for their respective appearance, colour, texture, taste and mouthfeel. The results of these evaluations are reported in the following Table 1.

TABLE 1

| Type of Starch | Concentration (% wt) | Calories (kcal/100 g) | Evaluation of the texture versus reference |
| --- | --- | --- | --- |
| Eurylon VII | 0.5 | 51 | + fluid; − thick |
| Eurylon VII | 2.0 | 58 | + gelified; + elastic |
| Eurylon VII/rice flour | 0.1/0.4 | 51 | similar |
| Eurylon VII/rice flour | 0.6/1.7 | 58 | + thick; + gelified |
| Amaizo 2568F | 0.5 | 51 | − gelified; − coating |
| Amaizo 2568F | 2.0 | 58 | + gelified; + thick |
| Amaizo 2568F/rice flour | 0.1/0.4 | 51 | similar |

TABLE 1-continued

| Type of Starch | Concentration (% wt) | Calories (kcal/100 g) | Evaluation of the texture versus reference |
|---|---|---|---|
| Amaizo 2568F/ rice flour | 0.6/1.7 | 58 | + thick; + gelified |
| Reference | | 80 | |

It appears from the above Table 1 that the mixtures high amylose starch/rice flour 0.1/0.4 are closest to the reference, but have a caloric reduction of about 30%.

On the other hand, it was also shown that addition of native high-amylose starch, i.e. non treated according to the invention, directly into the Bechamel sauce resulted in a grainy texture caused by starch granules aggregation which occurs during the heating process.

EXAMPLE 5

Mayonnaise

This example illustrates the preparation of a fat calorie reduced mayonnaise, wherein the high amylose starch and high amylose starch/rice flour products were used as fat replacers. The high amylose product also serves as whitening agent. The mayonnaise formulation is reported in the following Table 2.

TABLE 2

| Ingredients | Control (%) | Sample 1 (%) | Sample 2 (%) |
|---|---|---|---|
| Water | 68.4 | 68.4 | 68.4 |
| Sunflower oil | 10.0 | 2.0 | 2.0 |
| Vinegar, mustard | 11.0 | 11.0 | 11.0 |
| Skim milk powder, whey protein conc. | 7.0 | 7.0 | 7.0 |
| Hydrocolloids, aroma, spices | 3.6 | 8.6 | 8.6 |
| HA-starch product | — | 3.0 | — |
| HA-starch/rice flour product (1:1) | — | — | 3.0 |
| Calories (kcal) | 122 | 78 | 78 |

Sample 1: prepared with the high amylose (HA)-starch product

Sample 2: prepared with the high amylose (HA-starch/ rice flour product.

Hydrocolloids were slurried in a portion of the oil and mixed with water. All dry ingredients were slowly added to the blend under thorough mixing. Then, the remaining oil, vinegar, mustard, and the developed starch products (HA-Starch and HA-Starch/rice Starch) were added separately with mixing. This mixture was heated to 93°–95° C. under continuous agitation and then allowed to cool.

Evaluation of the mayonnaise preparations (round table tasting):

Control: smooth, creamy consistency, slightly transparent, no syneresis.

Sample 1: comparable to the control in texture and taste; white colour, no syneresis.

Sample 2: less thick than the control, smooth, slight cereal flavour, no syneresis.

EXAMPLE 6

Yoghurt

This example shows the preparation of standard yoghurt, fat reduced yoghurt and yoghurt containing high amylose starch product as texture agent and fat replacer. Yoghurt were prepared from retail milk, skim milk powder, sugar, water and the high amylose (HA)-starch product. The ingredients were blended together with a wire whip. The resulting mixtures were heated to 85° C. in stainless steel beakers, held at this temperature for 30 min. cooled to 40°–42° C., and then inoculated with 2 % bulk starter and cultured. The yoghurt was then stirred, poured into containers and cooled overnight, thereby achieving a final pH of 4.5.

TABLE 3

| | Yoghurt formulation | |
|---|---|---|
| Ingredients | Control (%) | Sample (%) |
| Water | 90.0 | — |
| Milk | — | 89.5 |
| Skim milk powder | 2.0 | — |
| Sucrose | 6.0 | 6.0 |
| Inoculum | 2.0 | 2.0 |
| HA-starch product | — | 2.5 |

Sensory evaluation (round table tasting): The sample was comparable to the control yoghurt with regard to the typical yoghurt flavour and textural attributes (smooth and creamy). The sample was however preferred for its white colour, and clean and fresh taste.

EXAMPLE 7

Mexican sauce

This example illustrates the preparation of a Mexican type sauce with the high amylose starch and high amylose/rice starch products as texture agents.

TABLE 4

| | Mexican sauce formulation | | |
|---|---|---|---|
| Ingredients | Control (%) | Sample 1 (%) | Sample 2 (%) |
| Water | 51.8 | 51.8 | 51.8 |
| Sunflower oil | 15.0 | 15.0 | 15.0 |
| Starch | 2.5 | — | — |
| Aroma, spices, tomato | 30.7 | 30.7 | 30.7 |
| HA-starch product | — | 2.5 | — |
| HA-starch/rice flour product (1:1) | — | — | 2.5 |

Sample 1: prepared with the high amylose starch product.

Sample 2: prepared with the high amylose-starch/rice flour product.

Sensory evaluation of the products (round table tasting): Sample 1 and 2 had a desired soft, pourable texture. The control sauce has a more solid, gel-like structure. The use of µ-particulate starch preparation described in this invention, especially the high amylose starch product (sample 1) favoured the typical sauce taste.

EXAMPLE 8

French Salad Dressing

This example illustrates the preparation of a salad dressing using the high amylose starch product as a fat replacer.

TABLE 5

| | French salad Dressing Formulation | |
| --- | --- | --- |
| Ingredients | Control (%) | Sample (%) |
| Sunflower oil | 38.3 | 25.5 |
| Water | 21.1 | 27.2 |
| Vinegar, mustard, aroma, spices, hydrocolloids | 40.6 | 44.8 |
| HA-starch product | — | 2.5 |
| Calories (kcal) | 400 | 295 |

The sample was prepared with the high amylose (HA)-starch product.

The hydrocolloid was slurred in a portion of the oil and mixed with water in a Hobart mixer with a whip attachment for 3 min. The blend of all dry ingredients was added to the mixture for another 3 min. Then, the remaining oil and the vinegar were added separately with mixing after each addition.

Sensory evaluation (round table tasting) The sample containing the HA-starch product had a pourable texture and was acceptable in appearance, mouthfeel and creaminess.

We claim:

1. A food grade texture agent comprising non crystalline particles of high amylose starch wherein the amylose content of the starch is between 40 to 70%, and wherein 90% of the particles have a diameter in the range of 5 to 30 microns, said food grade texture agent obtained by suspending the high amylose starch in water to form a slurry, said slurry being free of added enzymes, heating said slurry to about 80°–100° C., under continuous controlled stirring without shearing so as to form a particle gel product which is resistant to swelling up to 120° C.; and cooling the product to room temperature.

2. The food texture agent according to claim 1, wherein the high amylose starch particles are mixed with a cereal flour when making said slurry.

3. The food texture agent according to claim 2, wherein the cereal flour is rice flour and wherein the texture agent has a ratio of said rice flour to said high amylose starch is about 1:1 to 1:4.

4. The food texture agent according to claim 3, wherein the ratio of high amylose starch to rice flour is 1:1.

5. The food texture agent according to claim 1, wherein the texture agent is in the form of a dehydrated powdered product which is reconstitutable in water.

6. The food texture agent according to claim 1, wherein the texture agent is in the form of a three dimensional particle gel network at a concentration of about 10 to 30% wt in an aqueous phase.

7. A food product comprising the texture agent according to claim 1, wherein said texture agent is a fat substitute, in combination with a foodstuff selected from the group consisting of bechamel sauce, mayonnaise, yoghurt, Mexican sauce and salad dressing.

8. A process for preparing a food texture grade texture agent comprising:

a) suspending a high amylose starch having an amylose content ranging from 40 to 70% in water so as to obtain a slurry which is free of added enzymes;

b) heating the slurring of step a to a temperature of about 80° to 100° C. with continuous controlled stirring without shearing so as to form a particle gel product which is non crystalline and resistant to swelling up to 120° C.; and c) cooling said particulate gel product of step b) to room temperature to form a cooled particulate gel product.

9. The process according to claim 8, wherein the heating of the slurry of step b) is carried out under a pressure of about 0.3 bar and at least about 95° C.

10. The process according to claim 8, which further comprises the steps d) heating the cooled product of step c) to about 40° to 80° C. to obtain a reheated particulate gel product; and e) cooling the reheated particulate gel product of step d) to room temperature.

11. The process according to claim 8, wherein the food texture agent comprises high amylose starch combined with cereal flour.

12. The process according to claim 8, further comprising the step d) drying the cooled particulate gel product of step c) to a powder.

13. The process according to claim 12, wherein the high amylose starch of step a) is combined with maltodextrin in a ratio of 1:0.5 to 1:1 to form a slurry.

14. The process according to claim 8, further comprising the step of d) sterilizing the cooled food texture particulate gel of step c).

* * * * *